US006847994B1

United States Patent
Akimoto et al.

(10) Patent No.: US 6,847,994 B1
(45) Date of Patent: Jan. 25, 2005

(54) ERROR INFORMING APPARATUS AND ERROR INFORMING METHOD

(75) Inventors: Masao Akimoto, Kunitachi (JP); Kyoji Saito, Kawasaki (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 741 days.

(21) Appl. No.: 09/624,605

(22) Filed: Jul. 25, 2000

(30) Foreign Application Priority Data

Dec. 10, 1999 (JP) .......................................... 11-352035

(51) Int. Cl.[7] .............................................. G06F 15/16
(52) U.S. Cl. ..................................... 709/223; 358/402
(58) Field of Search ........................ 370/428; 709/204, 709/206, 290, 224, 223; 358/400, 402, 403

(56) References Cited

U.S. PATENT DOCUMENTS

| | | | | |
|---|---|---|---|---|
| 5,751,971 A | * | 5/1998 | Dobbins et al. | 709/238 |
| 5,767,985 A | * | 6/1998 | Yamamoto et al. | 358/402 |
| 5,838,685 A | * | 11/1998 | Hochman | 370/428 |
| 5,841,966 A | * | 11/1998 | Irribarren | 709/206 |
| 5,844,691 A | * | 12/1998 | Nishiyama et al. | 358/434 |
| 5,844,969 A | * | 12/1998 | Goldman et al. | 379/93.24 |
| 5,854,694 A | * | 12/1998 | Payne et al. | 358/473 |
| 5,881,233 A | | 3/1999 | Toyoda et al. | |
| 6,094,277 A | | 7/2000 | Toyoda | |
| 6,128,298 A | * | 10/2000 | Wootton et al. | 370/390 |
| 6,211,972 B1 | * | 4/2001 | Okutomi et al. | 358/402 |
| 6,381,038 B1 | * | 4/2002 | Endo | 358/405 |
| 6,405,251 B1 | * | 6/2002 | Bullard et al. | 709/224 |
| 6,507,869 B1 | * | 1/2003 | Franke et al. | 709/224 |
| 6,560,648 B1 | * | 5/2003 | Dunn et al. | 709/224 |

FOREIGN PATENT DOCUMENTS

| | | |
|---|---|---|
| JP | 8-242326 | 9/1996 |
| JP | 11239226 | 8/1999 |
| JP | 11261977 | 9/1999 |

OTHER PUBLICATIONS

Postel, J., "Internet Control Message Protocol", Request for Comments (RFC) 792, Sep. 1981.*
Conta, A. et al., "Internet Control Message Protocol (ICMPv6) for the Internet Protocol Version 6 (IPv6) Specification", Request for Comments (RFC) 1885, Dec. 1995.*
Conta, A. et al., Internet Control Message Protocol (ICMPv6) for the Internet Protocol Version 6 (IPv6) Specification, Request for Comments (RFC) 2463, Dec. 1998.*
English Language Abstract of JP 11–239226.
English Language Abstract of JP 11–261977 and partial English translation of paragraph [0043].

* cited by examiner

Primary Examiner—Marc D. Thompson
(74) Attorney, Agent, or Firm—Greenblum & Bernstein, P.L.C.

(57) ABSTRACT

An error detecting section detects an error caused in a mail transmitting section. The error detecting section instructs an error message data generating section to generate an error message data when detecting the error. The error message data includes a character string generated to correspond to the error, and a code. The error message data generating section transmits generated error message data to an ICMP processing section. The ICMP processing section has a function of notifying a communication partner of information using a packet in accordance with a protocol for management, which reports information of a protocol state of IP layer, that is ICMP (Internet Control Message Protocol). The ICMP processing section puts error message data into a Data frame of the packet, and transmits this packet to a predetermined destination via LAN.

7 Claims, 8 Drawing Sheets

| 1000 ~ 1990 | PROGRAM A |
|---|---|
| 2000 ~ 2990 | PROGRAM B |
| 3000 ~ 3990 | PROGRAM C |
| 4000 ~ 4990 | PROGRAM D |

ERROR INFORMING APPARATUS AND ERROR INFORMING METHOD

BACKGROUND OF THE INVENTION

1. Field of the Invention

The present invention relates to an error informing apparatus and an error informing method.

2. Description of the Related Art

Conventionally, a functional expansion board, which has devices and software, which are necessary for network communications such as a LAN interface, is added to an expansion slot, which is provided in the main body of the existing apparatus such as a facsimile apparatus, a printer, a copy machine, etc., so that a network-capable function is added to the main body of this apparatus.

For example, the following case can be explained when the function of the Internet facsimile apparatus (hereinafter referred to as IFAX") as disclosed in Unexamined Japanese Patent Publication HEI No. 8-242326 and the corresponding U.S. Pat. No. 5,881,233 is added to the conventional facsimile apparatus (hereinafter referred to as PSTN-FAX) using the telephone line. Specifically, LAN board, which has devices such as an interface for connecting to CPU, LAN, and a memory with such a program that implements each function of format converting means for converting image data to a format of e-mail, format invert converting means for converting e-mail to format of image data (facsimile data) and e-mail receiving/transmitting means for receiving/transiting email-format image data over LAN, is added to the main body of PSTN-FAX. Then, necessary data is exchanged between CPU on the main body of the facsimile apparatus side and CPU on the LAN board side so that IFAX communication processing is implemented.

In this case, connection between a mail server and IFAX cannot be sometimes established because of occurrence of error on the LAN board side, or the LAN side, or the mail server side. At this time, CPU on the main body of IFAX displays a message, which indicates an error, for example, "server connection fault" or a code on a display on the main body of IFAX side so as to inform an operator of occurrence of abnormity.

However, information that the operation can know from the message is too rough to determine the reason why the IFAX cannot connect to the mail server easily. As the reason why the IFAX cannot connect to the mail server, various reasons such as trouble of LAN board, that of LAN, that of mail server, etc., can be considered. Moreover, the measures against the trouble differ depending on at which stage of protocol the trouble has occurred.

To detect the trouble occurred in the LAN board and notify the operator of the result specifically, the upgrading of the program on the LAN board or the installation of an auxiliary program can be considered. To recognize this notification by the main body of IFAX the facsimile apparatus and display on the display device, there must be provided communication means between the main body of the facsimile apparatus and the LAN board. For this reason, the upgrading of the program on the main body of the facsimile apparatus or the installation of an auxiliary program is needed in the same manner as the above. This results in increases in time and cost, which are required for development. Moreover, this upgrading increases an area where the program occupies in the memory on the main body of IFAX side, causing trouble in which an area for receiving an image is reduced.

Additionally, in the present system, the code or the message, which corresponds to the trouble in the LAN board, is divided into parts, so that specific error information can be classified to some degree. In this case, however, complex information, which is unnecessary for the user, is displayed on the display device, and this may confuse the user.

SUMMARY OF THE INVENTION

It is an object of the present invention is to provide an error informing apparatus that is capable of detecting occurrence of error of the apparatus or an error over a computer network to inform an outer apparatus of the result without using the resources of the main body of the apparatus, and its error informing method.

In order to achieve the above object, the present invention detects an error, which is caused in a functional expansion apparatus itself, a computer network, and an apparatus connected to the computer network, and the present invention puts information of the detected error into a Data frame of a packet, and sends it to an outer terminal. Then, the outer packet keeps watch on this packet.

The outer terminal monitors the error caused in the functional expansion apparatus and the like so as to specifically grasp a point and stage which trouble occurs in the communication. This makes it possible to implement the monitoring of error regardless of the configuration of the main body of the apparatus, and to appropriately deal with the trouble in a short time.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

Figure 1:
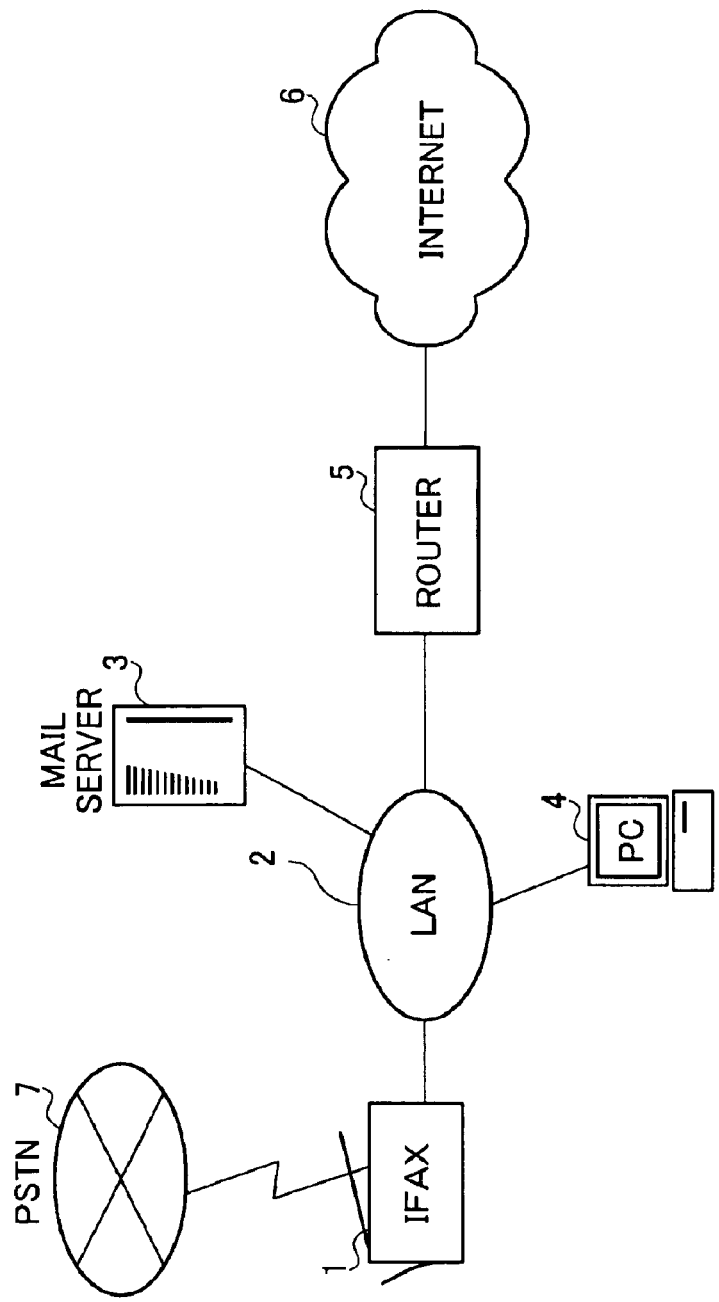
FIG. 1 is a conceptual view showing a computer network system where a facsimile apparatus, which has a LAN board, operates according to an embodiment of the present invention.

An embodiment of the present invention will now be described specifically with reference to the drawing accompanying herewith.

FIG. 1 is a conceptual view showing a computer network system where a facsimile apparatus (IFAX), which has a LAN board, operates according to an embodiment of the present invention.

IFAX 1 according to this embodiment is connected to a local area network (LAN) 2. A mail server 3 and a personal computer (PC) 4, which are provided in the same network as that of IFAX 1, are connected to LAN 2. Moreover, LAN 2 is connected to the Internet 6 via a router 5. Furthermore, IFAX 1 is connected to PSTN 7.

This embodiment exemplifies a case in which IFAX 1 detects an error occurred in transmitting e-mail according to SMTP and the detected error is recognized by PC 4 on LAN 2.

Figure 2:
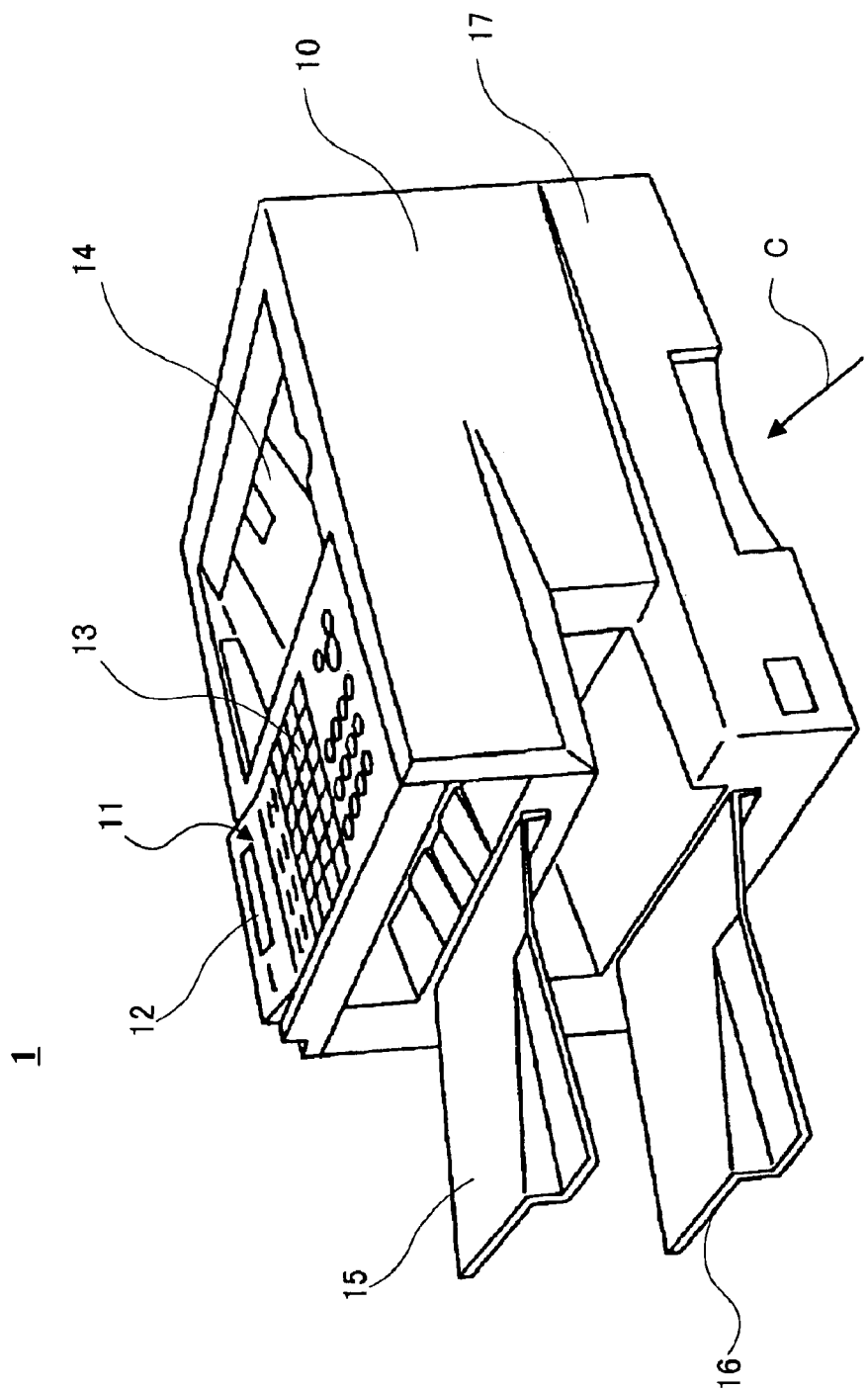
FIG. 2 is a perspective view showing an appearance of an Internet facsimile apparatus according to the above embodiment.

FIG. 2 is a perspective view showing an appearance of IFAX according to the above embodiment. The following will explain the case in which IFAX 1 is seen from the direction, which is shown by an arrow C in FIG. 2. A panel control section 11 is provided on a left side surface side, which is an upper surface portion of a housing body 10 of IFAX 1. The panel control section 11 has a display 12 for displaying various kinds of information, and keys 13 for inputting an address, an instruction, and the like.

A document plate 14 for supplying an original to a scanner is provided at the right of the panel control section 11. Output trays 15 and 16 that receive printed materials dropped thereto are continuously provided at a left side surface portion of IFAX 1 in a vertical direction. A paper feeding section 17 that feeds printed materials to a printer is provided at a bottom surface portion of IFAX 1.

Figure 3:
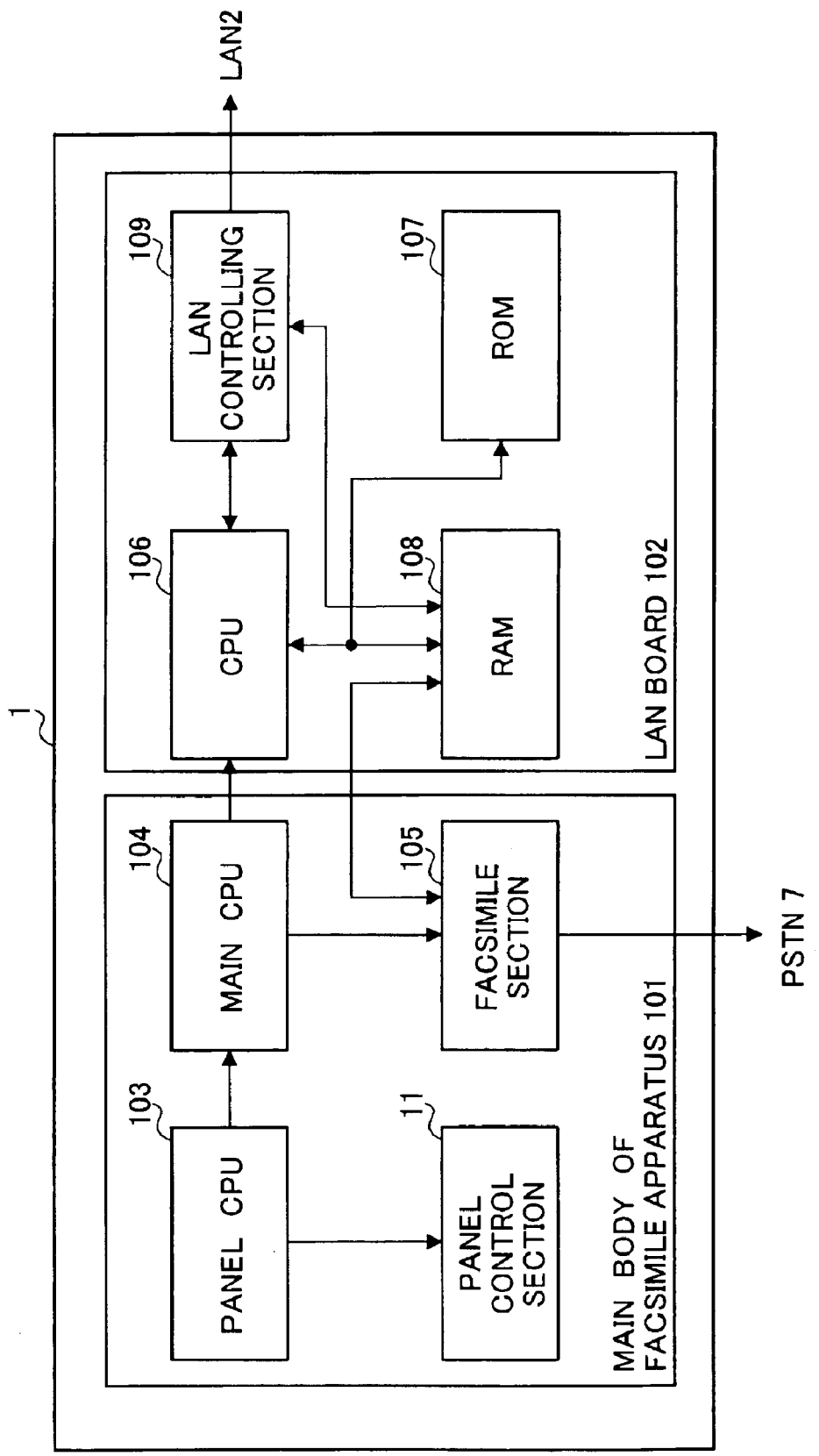
FIG. 3 is a block diagram showing a hardware configuration of the Internet facsimile apparatus according to the above embodiment.

FIG. 3 is a block diagram showing a hardware configuration of the IFAX according to the above embodiment.

IFAX 1 is composed of a main body 101 of IFAX and a LAN board 102. They are connected to each other in serial or parallel although their connection form is not limited.

In the main body 101 of IFAX, a user performs various kinds of operations from the panel control section 11. A panel CPU 103 controls mainly a signal input from this panel control section 11. A main CPU 104 controls a signal to be output to the LAN board 102, and also controls a facsimile section 105 that performs communications on dialup. The facsimile section 105 comprises a scanner, a compression/decompression section and a printer.

At a transmitting time, the scanner scans an original, and generates bitmap data. The compression/decompression section compresses the bitmap data in a compressed format form, for example, MH, which is used in facsimile communications. While, at a receiving time, received MH data is decompressed by the compression/decompression section so as to obtain bitmap data, and the bitmap data is printed by the printer.

Moreover, in the LAN board 102, CPU 106 executes a program, and controls the entirety of the LAN board 102. ROM 107 stores the program, which CPU 106 executes. RAM 108 has a work area where the program is executed and a buffer where various kinds of data such as e-mail, an image file, and the like are temporarily stored. A LAN interface 109 is an interface that executes a procedure, which is necessary for receiving and transmitting data such as e-mail over LAN 2 and Internet 6.

In IFAX 1, the scanner and printer of the facsimile section 105 are integrated into the housing body 10 of FIG. 2 together with other configuration components, that is, panel controls section 11, panel CPU 103, main CPU 104, and CPU 106, ROM 107, RAM 108, LAN interface 109, which are provided in the LAN board 102 side.

The above-configured IFAX 1 relating to this embodiment scans the original using the scanner of facsimile section 105, and obtains bitmap data. The compression/decompression section compresses the bitmap data to HM data. One MH data per one page of original is generated. The main CPU 104 transmits this MH data to the LAN board 102. The CPU 106 on the side of LAN board 102 stores MH data received to the buffer area of RAM 108.

Figure 4:
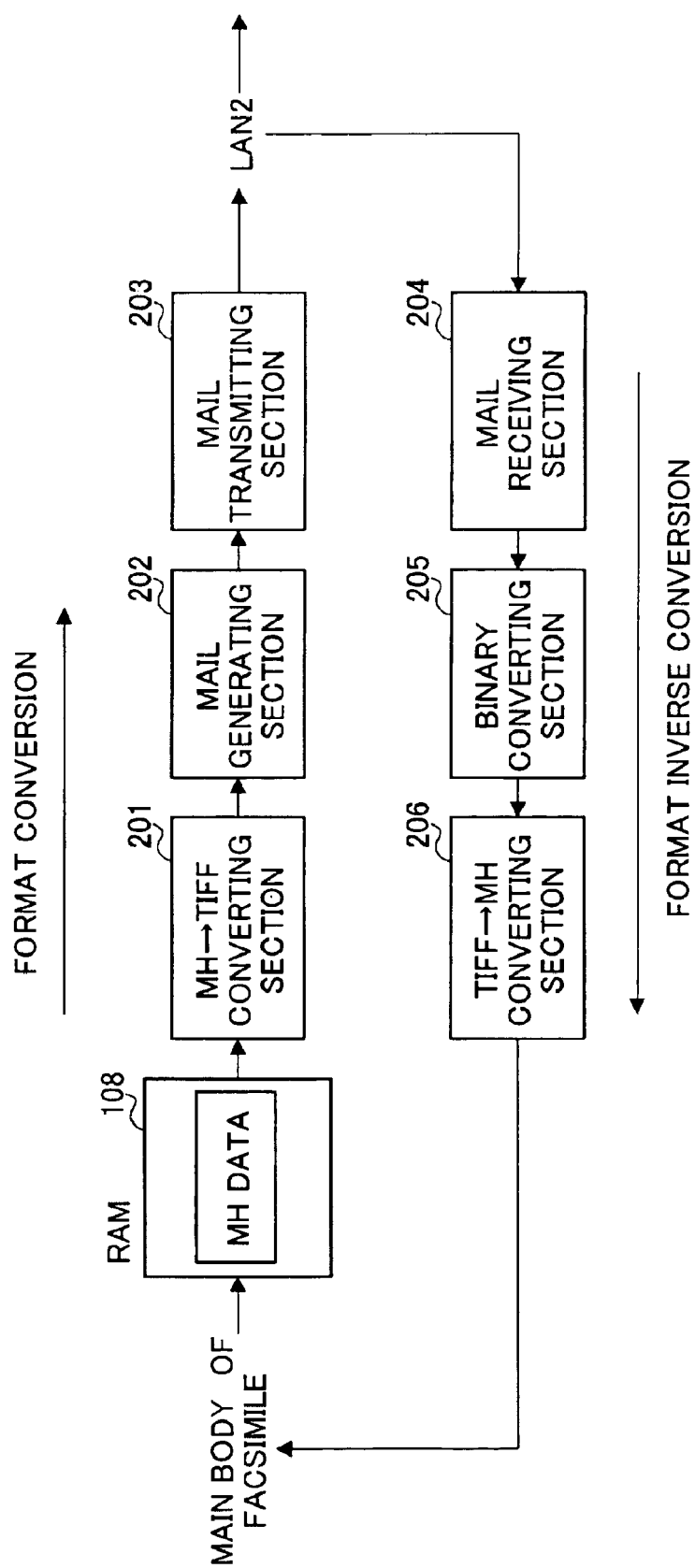
FIG. 4 is a block diagram showing an IFAX function of a LAN board according to the above embodiment.

FIG. 4 is a block diagram showing the IFAX function of LAN board according to the above-mentioned embodiment.

In the LAN board 102, MH→TIFF converting section 201 converts MH data to a TIFF file. Since one MH data per one page of original is generated, a plurality of MH data is generated when the number of pages of is two or more. At this time, MH→TIFF converting section 201 converts the plurality of MH data to one TIFF file. Next, a mail generating section 202 generates e-mail accompanied with a TIFF file. Namely, the TIFF file is coded to a text code, and the text-coded TIFF file data is attached to a multipart mail in accordance with, for example, an MIME format. A mail transmitting section 203 transmits this e-mail to a destination in accordance with SMTP.

While, at a receiving time, when the e-mail is received by a mail receiving section 204, text-coded TIFF file data attached to this e-mail is decoded to a TIFF file by a binary converting section 205. Next, a TIFF→MH converting section 206 decompresses the TIFF file to obtain MH data. The LAN board 102 transmits MH data to the: main body 101 of IFAX.

In the main body 101 of IFAX, the compression/decompression section of facsimile section 105 decompresses HM data to obtain bitmap data. The bit map data is printed by the printer.

Thus, the LAN board 102 converts image data from the main body 101 of IFAX to the e-mail format so that the converted data is transmitted to the destination, and/or converts received image data of e-mail format to original image data so that the converted data is transmitted to the main body 101 of IFAX.

Figure 5:
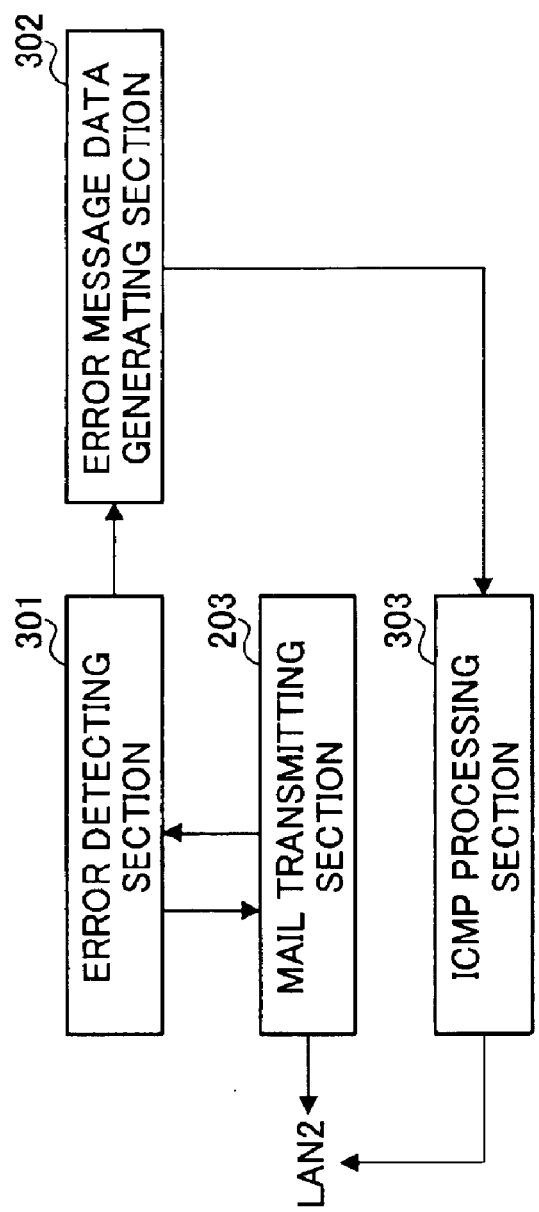
FIG. 5 is a block diagram showing an error detecting function of the LAN board according to the above embodiment.

FIG. 5 is a block diagram showing an error detecting function of the LAN board according to the above embodiment.

An error detecting section 301 detects an error occurred in the mail transmitting section 203. The error detecting section 301 instructs an error message data generating section 302 to generate error message data when detecting an error. The error message data includes a character string, a code, and the like which are generated in accordance with the error. The error message data generating section 302 transmits generated error message data to an ICMP processing section 303. The ICMP processing section 303 has a function of notifying a communication partner of information using the packet in accordance with a protocol for management, which reports information of a protocol state of IP layer, that is ICMP (Internet Control Message Protocol). The ICMP processing section 303 puts error message data into the Data frame of the packet, and transmits this packet to a predetermined destination via LAN 2.

Figure 6:
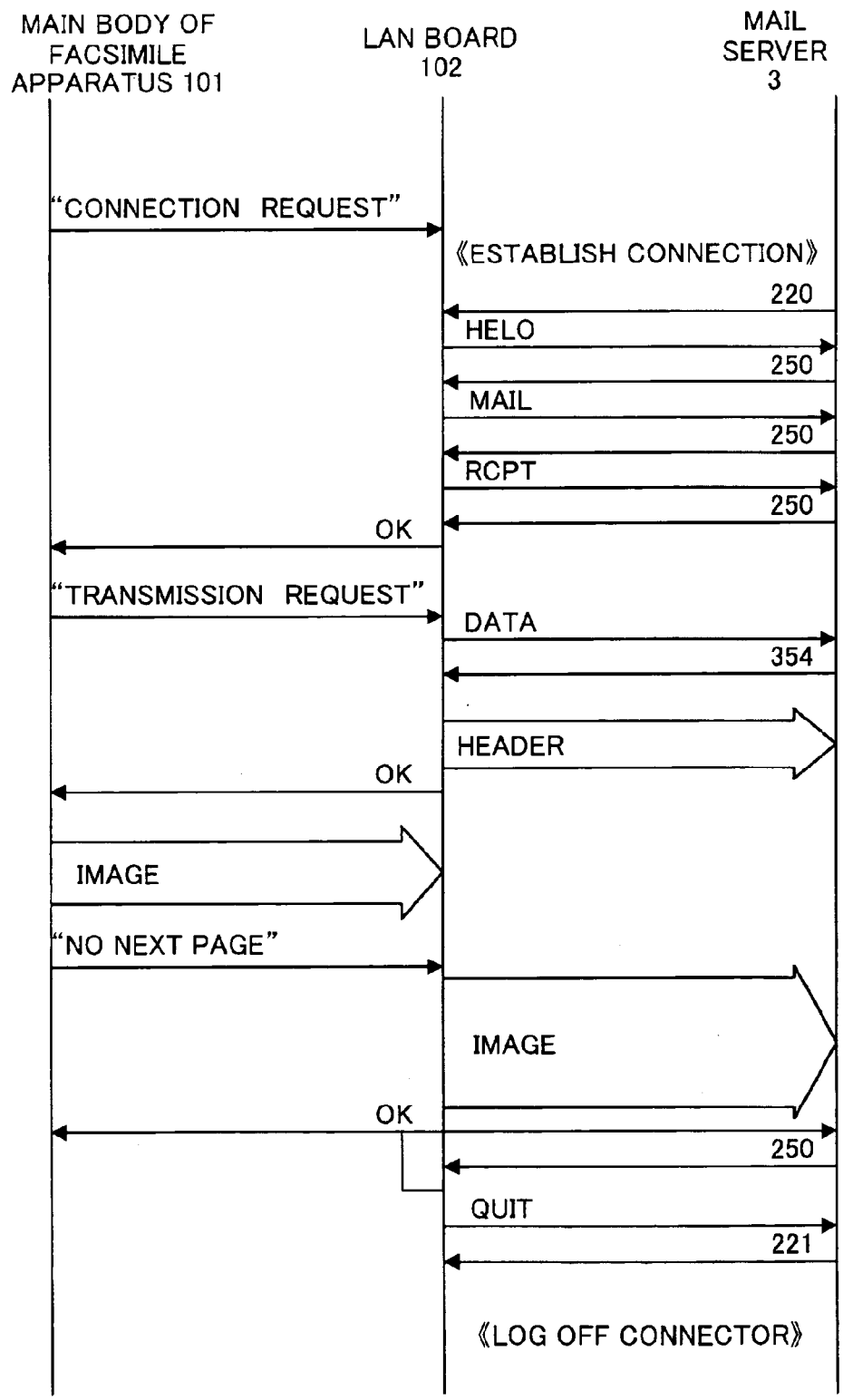
FIG. 6 is a sequence view showing a procedure for transmitting e-mail among the main body of the facsimile apparatus, LAN board, and mail server using SMTP (Simple Mail Transport Protocol) according to the above embodiment.

FIG. 6 is a sequence view showing a procedure for transmitting e-mail among the main body of IFAX, LAN board, and mail server using SMTP according to the above embodiment.

When a connection request is sent from the main body 101 of IFAX to the LAN board 102, the LAN board 102 executes a procedure for establishing connection with the mail server 3. When connection with the mail server 3 is established, the LAN board 102 responses to the main body 101 of IFAX. Next, when the main body 101 of IFAX sends a transmission request to the LAN board 10.2, the LAN board 102 transmits a header first. Then, the LAN boarder 102 receives image data (MH data) from the main body 101 of IFAX, and converts image data to TIFF as mentioned above, and transmits it to the mail server 3. After the transmission, the LAN board 102 logs off connection with the mail server 3, and ends transmission processing.

In the above-explained transmission processing, the LAN board 102 detects an error, and provides notification.

Figure 7:
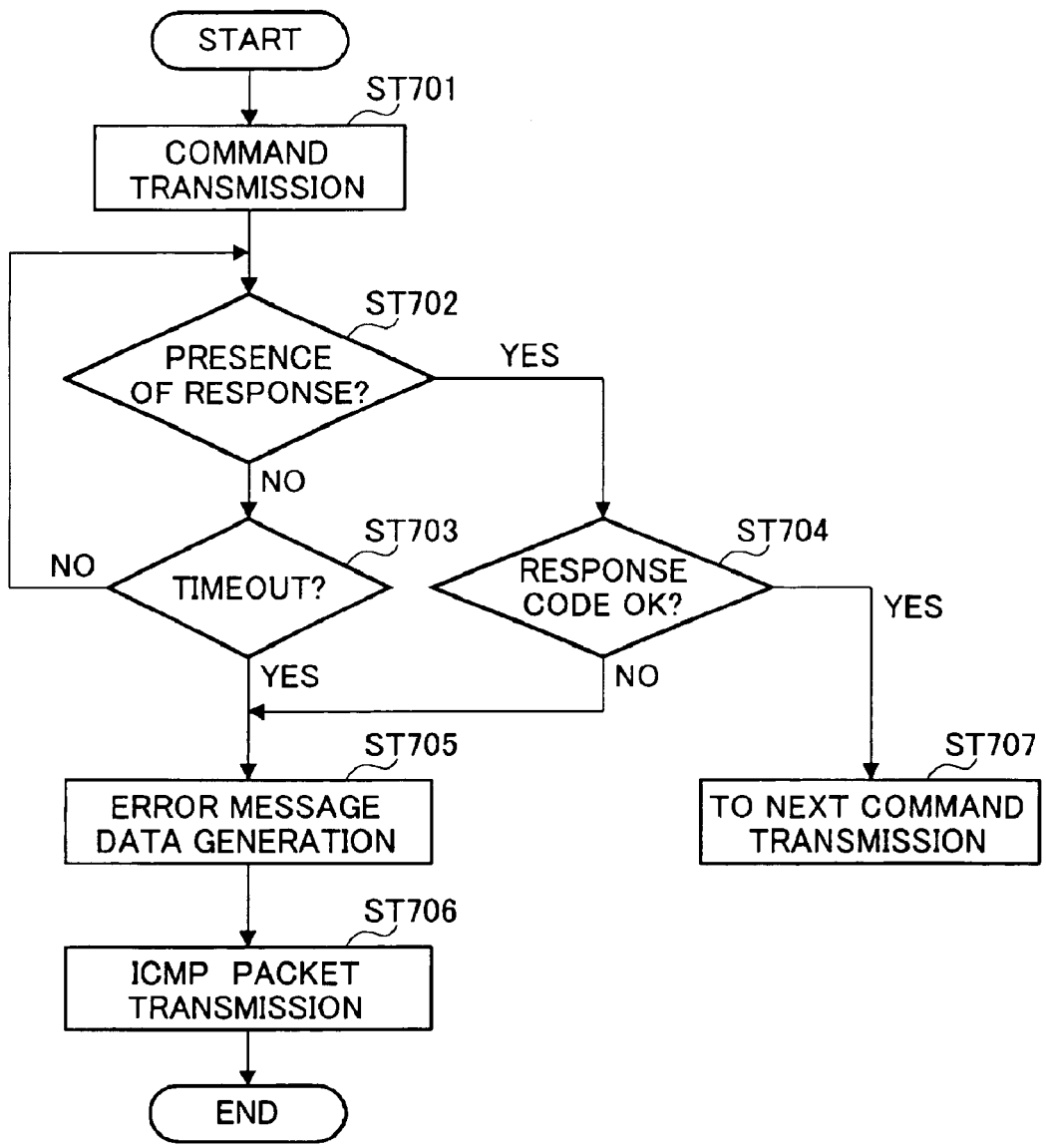
FIG. 7 is a flowchart showing each step of error detection processing of LAN board according to the above embodiment.

FIG. 7 is a flowchart showing each step of error detection processing of the LAN board according to the above embodiment.

In step (hereinafter referred to ST) 701, the mail transmitting section 203 of LAN board 102 sends a command (for example, HELLO, MAIL, RCPT, DATA, QUIT, and the like) to the mail server 3.

In ST702, the error detecting section 301 determines whether or not the mail server 3 has sent a response. If there is no response, the error detecting section 301 determines whether or not a predetermined period of time has passed. If the predetermined period of time has not passed, the operation goes back to ST702 and the error detecting section 301 determines whether or not the mail server 3 has sent a response. In this way, the error detecting section 301 waits for the response from the mail server 3.

If there is the response from the mail server 3 in ST702, the error detecting section 301 determines whether or not a response code of the response adapts to the command. For example, if the LAN board 102 and mail server 3 are connected to each other using TCP, the mail server 3 sends a response with a command of "220". Therefore, if the response is "220", the error detecting section 301 determines that the response code is adaptable. Similarly, if "250" to HELLO command, "250" to MAIL command, "250" to RCPT command, "354" to DATA command, and "221" to QUIT command are respectively sent to the error detecting section 301 as a response, the error detecting section 301 determines that each response code is adaptable. Then, when the response code is adaptable, an operation moves to transmission of a next command.

If the predetermined period of time has passed in ST703 or the response code is not adaptable in ST704, the error message data generating section 302 generates error message data corresponding to the command in ST705. In this case, error message data is generated such that an error-generated stage can be understood.

Figures 8, 9:
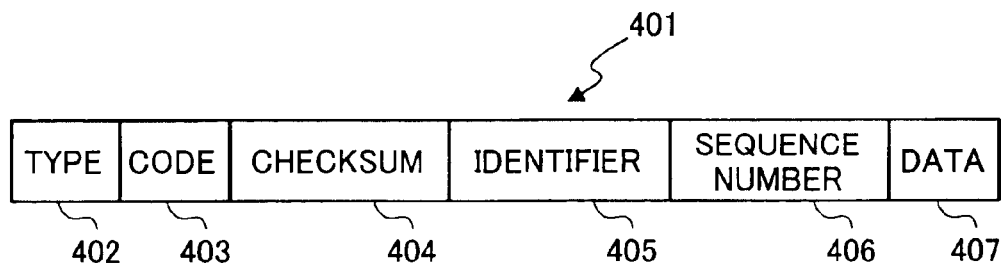
FIG. 8 is a view showing a format of an ICMP packet.
FIG. 9 is a view showing the configuration of programs of the main body of the facsimile apparatus and LAN board according to the above embodiment.

Next, in ST706, the ICMP processing section 303 generates a packet of ICMP including error message data, and sends it onto LAN 2. The format of ICMP packet is shown in FIG. 8. This ICMP packet 401 is composed of the respective frames of Type 402, Code 403, Checksum 404, Identifier 405, Sequence Number 406, and Data 407. Error message data is put into Data frame 407.

In this example, the type of packet is "Echo request" that requests echo back transmission of IP packet from the, destination, and that is executed by a command, which is so-called PING. This ICMP packet 401 is transmitted to the fixed destination address. In this example, the destination address is set to the router 5, which is connected to LAN 2. After the ICMP processing section 303 thus transmits ICMP packet 401, processing is ended.

When the router 5 receives the ICMP packet 401 transmitted to LAN 2 from the ICMP processing section 303, data including Identifier frame 403 and afterward is directly replied as "Echo reply." Error message data is directly included in the Data frame 407. This replied "Echo reply" is ignored by the LAN board 102.

Next, error message data will be specifically explained. A plurality of programs A to D shown in FIG. 9 is executed, and each processing such as communications and the like is carried out. Here, for example, it is assumed that a name of program, which waits for the detection of a response signal in ST702 to ST703 of FIG. 7 and its row number are set to Data frame 407 of packet 401. PC 4 captures and analyzes them, so that the name of program and its row number can be grasped. This allows efficiency of debug to be improved.

The program name and its row number are those that are extracted when the program is generated and compiled. They are set every program.

In this case, error message data other than the name of program and the row number may be used, and for example, a character string, which shows an error name, may be used.

As mentioned above, when the LAN board 102 detects the error, the LAN board 102 generates error message data corresponding to this error and transmits the packet including the error message data onto LAN 2. Then, a LAN analyzer, which operates on PC 4, monitors the packet flowing on LAN 2. The analyzer is an application that has functions, which captures the packet from LAN 2, stores the packet to a buffer memory or a hard disk, and which analyzes the packet to display. It is possible to use the LAN analyzer, which is currently on the market. When the LAN analyzer captures the ICMP packet transmitted from the LAN board 102 and displays it, it is possible to see error message data, which is included in the Data frame 407. A person, who is in charge of maintenance, views the analytical result of packet 401. This makes it possible to easily grasp at which stage trouble has occurred, and to obtain measures against the problem rapidly. More specifically, if no response signal is sent from the mail server 3 or a signal, which is different from one expected, is sent, there is a high possibility that a bug will be present in the program of mail transmitting section 203. Then, the program must be debugged. According to this embodiment, since it is possible to easily grasp at which stage the error has occurred, debugging time can be largely reduced.

As mentioned above, the LAN board 102 relating to this embodiment detects the error generated in the LAN board 102 itself, LAN 2, and mail server 3 (hereinafter referred to as LAN board side) regardless of the configuration of the main body 101, and informs the outer apparatus of the detected result. This eliminates the need for providing any addition and change to the hardware of the main body 101 of IFAX and the software. Therefore, it is possible to reduce time and cost, which are required for development of IFAX 1. Also, this makes it possible to prevent the increase in an area where the program occupies in the memory on the main body 101 of IFAX and the reduction in an area for receiving an image.

Additionally, as explained in the above embodiment, it is monitored whether or not the transmission of command and the response are normally performed at each stage of the procedure, which is carried out between the LAN board 102 and mail server 3. When abnormality occurs, notification of specific error message can be sent, and this makes it possible to obtain more detailed information from the LAN board 102.

Moreover, the LAN board 102 relating to the above embodiment adds error message data to the packet such as ICMP packet, transmits this packet onto LAN 2, and monitors this packet using the LAN analyzer of PC 4. This establishes a communication line between the LAN board 102 and PC 4, so that the amount of processing is smaller than the case in which error information is transferred to PC 4 from the LAN board 102, and little influence of LAN 2 is exerted thereon. As a result, stable error monitoring can be carried out. Further, there is no need to install an application, which is dedicated to communications with the LAN board 102, to PC 4.

Moreover, since the LAN board 102 relating to this embodiment uses the existing protocol such as Echo Request of ICMP, it is possible to provide notification of error with high reliability and high safety. In addition, since ICMP is extremely simple, there is an advantage in which trouble is not easily generated. Furthermore, since the LAN analyzer, which is on the market, can be used, the application dedicated to PC is not necessarily developed.

The above embodiment exemplified the case of mail transmission using SMTP. The present invention is not limited to this case. The present invention can be applied to error detection at a mail receiving time. Moreover, the present invention can be applied to error detection and notification using other mail transfer protocols such as POP3, IMAP4, and data transfer protocols such as FTP, HTTP.

Additionally, the packet of "Echo Replay", which is replied to the LAN board 102 from the router 5, may be captured and analyzed by the LAN analyzer of PC 4 since the error message data is included in Data frame 407.

Further, the destination of ICMP packet 401 may be PC 4, which can receive "Echo Request" and store the content, and a workstation (WS) in place of router 5. In this case, it is possible for PC 4 or WS to store and confirm an error log.

The present invention is not limited to the above-mentioned embodiment, and various modifications can be made without departing from the sprit and scope of the invention. For example, the present invention can be applied to a network expansion card, which provides a data communication function via LAN to IFAX, a copy machine, a printer, a multiple apparatus, and the like via LAN. In this case, the network expansion card has at least an LAN interface. Then, the error is detected by this card, and error information is put to the packet, and transmitted onto LAN. In other words, the present invention includes a functional expansion apparatus, which has at least an interface for connecting to the commuter network, and which expands the communication function with respect to the main body of the apparatus.

The above embodiment explained the case in which LAN card 102 was internally connected to the main body 101 of IFAX. However, the present invention is not limited to such functional expansion board. For example, the present invention includes a functional expansion apparatus (functional expansion adapter), which is externally connected to the electronic equipment, as in IFAX adapter, which is externally connected to the main body of IFAX. An error informing apparatus, which has no configuration for functional expansion, is included in the scope of the present invention.

The invention may be conveniently implemented using a conventional general purpose digital computer or microprocessor according to teachings of the present specification, as will be apparent to those skilled in the computer art. Appropriate software coding can readily be prepared by skilled programmers based on the teachings of the present disclosure, as will be apparent to those skilled in software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

According to the present invention, it is possible to grasp detailed information of error, for example, in which module an error has occurred, by what sequence the error has been generated, to what extent processing has progressed at the error generating time, and how the internal state has been set. Additionally, it is possible to grasp such detailed information of error from the external apparatus without using the resources (memory, program, new communication means, and the like) of the main body of the apparatus.

The present invention is not limited to the above described embodiments, and various variations and modifications may be possible without departing from the scope of the present invention.

This application is based on the Japanese Patent Application No. HEI11-352035 filed on Dec. 10, 1999, entire content of which is expressly incorporated by reference herein.

What is claimed is:

1. An error informing apparatus included in an Internet facsimile apparatus, the Internet facsimile apparatus connected to a mail server via a LAN, the Internet facsimile apparatus not having an ability to analyze an "Echo reply" packet, the "Echo reply" packet being a response to an "Echo request" packet, the error informing apparatus comprising:

a controller configured to transmit a command for an Internet transmission to the mail server, to detect whether a response to the command is received from the mail server, to generate an IP packet including an error message one of when the response to the command is not received for a predetermined time and or when the response to the command is incorrect, and to transmit the IP packet including the error message to a predetermined communication apparatus configured to receive the IP packet, the predetermined communication apparatus being connected to the error informing apparatus via the LAN, the IP packet being the "Echo request" packet which requests the predetermined communication apparatus to transmit the "Echo reply" packet back to the error informing apparatus;

the controller being further configured to receive the "Echo reply" packet from the predetermined communication apparatus, the "Echo reply" packet being captured for subsequent analysis by a LAN monitoring analyzing apparatus connected to the error informing apparatus via the LAN.

2. The error informing apparatus according to claim 1, wherein the predetermined communication apparatus connected to the error informing apparatus via the LAN comprises a router which connects the LAN with an Internet.

3. The error informing apparatus according to claim 1, wherein the LAN monitoring analyzing apparatus connected to the error informing apparatus via the LAN comprises a personal computer.

4. The error informing apparatus according to claim 1, wherein the error message includes a name of a program which the error informing apparatus executes when the error informing apparatus waits for the response to the command from the mail server.

5. The error informing apparatus according to claim 1, wherein the error message includes a name and a row number of a program which the error informing apparatus executes when the error informing apparatus waits for the response to the command from the mail server.

6. An Internet facsimile apparatus connected to a mail server via a LAN, the Internet facsimile apparatus not having an ability to analyze an "Echo reply" packet, the "Echo reply" packet being a response to an "Echo request" packet, the Internet facsimile apparatus comprising:

a transformer configured to transform an image data into a data format of an e-mail;

a controller configured to transmit a command for an Internet transmission to the mail server, and to transmit, to the mail server, an e-mail to which the transformed data is attached;

the controller is configured to generate an IP packet including an error message when the response to the command is not received for a predetermined time or when the response to the command is incorrect, and to transmit the IP packet including the error message to a predetermined communication apparatus configured to receive the IP packet, the predetermined communication apparatus being connected to the Internet facsimile apparatus via the LAN, the IP packet being the "Echo request" packet which requests the predetermined communication apparatus to transmit the "Echo reply" packet back to the Internet facsimile apparatus;

the controller being further configured to receive the "Echo reply" packet from the predetermined communication apparatus, the "Echo reply" packet being captured for subsequent analysis by a LAN monitoring analyzing apparatus connected to the Internet facsimile apparatus via the LAN.

7. An error informing method comprising:

transmitting a command for an Internet transmission to a mail server;

detecting whether a response to the command is received from the mail server;

generating an IP packet including an error message when the response to the command is not received for a predetermined time or when the response to the command is incorrect;

transmitting the IP packet including the error message to a predetermined communication apparatus configured to receive the IP packet, the predetermined communication apparatus being connected to the source of the IP packet via a LAN, the IP packet being an "Echo request" packet which requests transmission of an "Echo reply" packet back to a source of the IP packet, the "Echo reply" packet being a response to the "Echo request" packet; and receiving the "Echo reply" packet from the predetermined communication apparatus, the "Echo reply" packet being captured for subsequent analysis by a LAN monitoring analyzing apparatus connected to the LAN.

* * * * *